United States Patent
Kobayashi

(10) Patent No.: US 8,011,273 B2
(45) Date of Patent: Sep. 6, 2011

(54) WAVE GENERATOR, WAVE GEAR DEVICE, AND METHOD OF PREVENTING REDUCTION IN EFFICIENCY OF WAVE GEAR DEVICE

(75) Inventor: Masaru Kobayashi, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 641 days.

(21) Appl. No.: 12/215,164

(22) Filed: Jun. 25, 2008

(65) Prior Publication Data
US 2009/0038434 A1   Feb. 12, 2009

(30) Foreign Application Priority Data
Aug. 8, 2007   (JP) .................. 2007-206781

(51) Int. Cl.
*F16H 33/00*   (2006.01)
(52) U.S. Cl. .......................... 74/640; 74/567
(58) Field of Classification Search .................... 74/640, 74/411, 461
See application file for complete search history.

(56) References Cited

U.S. PATENT DOCUMENTS 3,166,949 A * 1/1965 Lapp ............................... 74/433
6,082,222 A * 7/2000 Kiyosawa et al. .............. 74/640

* cited by examiner

*Primary Examiner* — Justin Holmes
(74) *Attorney, Agent, or Firm* — Flynn, Thiel, Boutell & Tanis, P.C.

(57) ABSTRACT

A wave generator (4) of a wave gear device (1) is formed from a material in which only the minor axis-side portions (51, 52), which include the two end portions (51a, 52a) of an elliptical minor axis Lmin, has a larger coefficient of linear expansion than the other portions. When the temperature of a rigid cam plate (5) increases during high-speed rotational input, the minor axis-side portions (51, 52) thermally expand considerably more than the other portions do, and balls (10) other than several balls (10b) on a minor axis Lmin of a wave bearing (7) enter a tight state and form a locked state in which the wave bearing (7) rotates integrally with the rigid cam plate (5). Since the generation of agitation resistance of the lubricating agent due to the high-speed rolling movement of the balls (10) during high-speed rotational input can be avoided or reduced, a reduction of the torque transmission efficiency caused by the agitation resistance can be prevented or inhibited.

8 Claims, 5 Drawing Sheets

WAVE GENERATOR, WAVE GEAR DEVICE, AND METHOD OF PREVENTING REDUCTION IN EFFICIENCY OF WAVE GEAR DEVICE

TECHNICAL FIELD

The present invention relates to a wave generator for a wave gear device, and particularly relates to a technique for preventing a reduction in efficiency caused by lubricating agent agitation resistance produced by the wave generator during high-speed rotation.

BACKGROUND ART

A wave gear device is provided with a rigid internally toothed gear, a flexible externally toothed gear, and a wave generator. The flexible externally toothed gear is flexed in the radial direction by the wave generator and made to partially mesh with the rigid internally toothed gear, and the wave generator is rotated to thereby cause the meshing position of the two gears to move in the circumferential direction and generate relative rotation between the two gears due to difference in the number of teeth of the two gears.

A typical wave generator is provided with an elliptically contoured rigid cam plate and a wave bearing mounted on the external peripheral surface of the rigid cam plate. The wave bearing is provided with a radially flexible outer ring and inner ring, and a plurality of balls or other rolling elements that are rollably mounted between the rings, and is elliptically flexed by the rigid cam plate. The wave bearing is fitted inside the flexible externally toothed gear, and the flexible externally toothed gear and the rigid cam plate are held in a rotatable state relative to each other.

The wave gear device uses the rigid cam plate of the wave generator as a rotation input component and uses the rigid internally toothed gear or the flexible externally toothed gear as a reduced-speed rotation output component. The rigid cam plate rotates while repeatedly displacing all parts of the wave bearing and the flexible externally toothed gear in the radial direction. The inner ring of the wave bearing rotates at high speed together with the rigid cam plate, and the outer ring rotates integrally with the flexible externally toothed gear, and the balls inserted between the inner and outer rings roll along a raceway of the outer and inner rings, whereby the rigid cam plate and the flexible externally toothed gear can smoothly rotate relative to each other with little torque.

SUMMARY OF INVENTION

[Technical Problem]

Here, when a plurality of balls roll at high speed, considerable agitation resistance acts on each ball due to the lubricating agent. For this reason, there is a problem of a reduction in the torque transmission efficiency of a wave gear device in an operating state of high-speed rotational input.

An object of the present invention is to provide a wave generator for a wave gear device that can prevent or suppress this kind of reduction in efficiency.

Another object of the present invention is to provide a wave gear device provided with such a novel wave generator.

A further object of the present invention is to provide a method for preventing a reduction in efficiency of the wave gear device provided with such a novel wave generator.

[Solution to Problem]

In order to solve the above-stated problems, a wave generator for a wave gear device of the present invention comprising:

a rigid cam plate having an elliptical profile; and
a wave bearing mounted on an external peripheral surface of the rigid cam plate, wherein the wave bearing is provided with an inner ring and an outer ring capable of flexing in a radial direction, and a plurality of rolling elements rollably inserted therebetween, and the outer ring and the inner ring are elliptically flexed by the rigid cam plate, the rigid cam plate has a minor axis-side portion, which includes a minor axis-side external peripheral end portion positioned at two ends of a minor axis of the elliptical profile of the rigid cam plate, and the minor axis-side portion is formed from a material having a large coefficient of linear expansion in comparison with a remaining portion of the rigid cam plate.

Here, the minor axis-side portion can be set to be an area having a crescent shape that extends along the external peripheral surface of the rigid cam plate with the minor axis at the center.

The minor axis-side portion can be formed in an area having an angle range of 55 degrees to the left and right along the circumferential direction with the minor axis at the center.

The material for the minor axis-side portion can be aluminum alloy, 60/40, brass, beryllium copper, or SUS 305. In this case, a material for the remaining portion of the rigid cam plate can be steel material.

Next, the wave gear device of the present invention is characterized in being provided with the wave generator of the above-stated configuration.

A method of preventing a reduction in efficiency of the wave gear device of the present invention is characterized in adopting the above-stated configuration as the wave generator; locking the rolling movement of the rolling elements of the wave bearing with the aid of thermal expansion of the minor axis-side portion when the temperature of the rigid cam plate increases together with an increase in rotation speed of the rigid cam plate, and setting the wave bearing in a locked state of integral rotation with the rigid cam plate; and reducing an agitation resistance of a lubricating agent produced by the rolling movement of the rolling elements, and inhibiting a reduction of the torque transmission efficiency that is caused by the agitation resistance.

Here, one parameter selected from the shape of the minor axis-side portion, the shape formation area, and the coefficient of linear expansion of the material that forms the minor axis-side portion is modified, whereby the operating condition can be modified at the time the wave bearing switches to a locked state.

Examples of the operating conditions include the rotational speed of the rigid cam plate and the value of the temperature increase of the rigid cam plate.

[Advantageous Effect of Invention]

In the wave generator of the present invention, a wave bearing is elliptically flexed with the aid of a rigid cam plate, and the rolling elements positioned at the two ends of an elliptical major axis are tightly sandwiched between an inner and outer rings, and are in a state of rolling point contact with the raceway of the inner and outer rings. The remaining rolling elements positioned in a portion other than the two ends of the major axis have a gap between the internal and external rings and are held in a rollable state.

When the wave generator rotates at high speed and becomes heated, each of the parts of the wave generator undergoes thermal expansion. Since a minor axis-side portion of the rigid cam plate is formed from a first material having a large coefficient of linear expansion, the expansion distance of this portion is larger than the portion of the major axis side.

For this reason, due to the thermal expansion of the minor axis-side portion of the rigid cam plate, the gap between the inner ring raceway part, the rolling elements, and the outer ring raceway part of the wave bearing in the minor axis-side portion becomes narrow, and the number of rolling elements tightly sandwiched between the inner and outer rings increase in accompaniment with the temperature increase. When the number of rolling elements held in a rollable state becomes a prescribed number or less, the inner and outer rings of the wave bearing enter a locked state in which relative rotation is impossible.

The wave bearing integrally rotates with the rigid cam plate when the wave bearing is in a locked state. The wave bearing can smoothly rotate in an integral fashion with the rigid cam plate because sufficient lubricant film is formed between the flexible externally teethed gear and the external ring of the wave bearing during high-speed rotation.

Consequently, in the wave generator of the present invention, since the rolling elements can be locked to be kept from rotating at high speed during high-speed rotation, the agitation resistance of the lubricant generated due to the high-speed rolling movement of the rolling elements or the agitation resistance is reduced. Therefore, in accordance with the present invention, the reduction of the transmission torque efficiency during high-speed rotation can be prevented or suppressed.

Here, in order to lock the wave bearing during high-speed rotation, it is possible to consider forming the entire rigid cam plate from a first material having a high coefficient of linear expansion in comparison with the inner and outer rings of the wave bearing. However, when the entire rigid cam plate is formed from a material having a high coefficient of linear expansion, the elliptical major axis dimension of the rigid cam plate changes considerably due to thermal expansion brought about by heating during high-speed rotation. As a result, there is a possibility that the flexible externally toothed gear will not be flexed to a proper elliptical shape and become unable to adequately mesh with the rigid internally toothed gear.

In the wave generator of the present invention, the elongation due to the thermal expansion of the major axis direction of the rigid cam plate is small, and an adequate meshing state of the flexible externally toothed gear and the rigid internally toothed gear at the two end portions of the major axis is maintained even in a heated state. Therefore, the wave bearing can be kept in a locked state while an adequate meshing state of the two gears is maintained, and a reduction of the torque transmission efficiency caused by the agitation resistance of the lubricant can be prevented or suppressed.

DESCRIPTION OF EMBODIMENTS

Embodiments of a wave gear device to which the present invention has been applied are described below with reference to the drawings.

Figure 1:
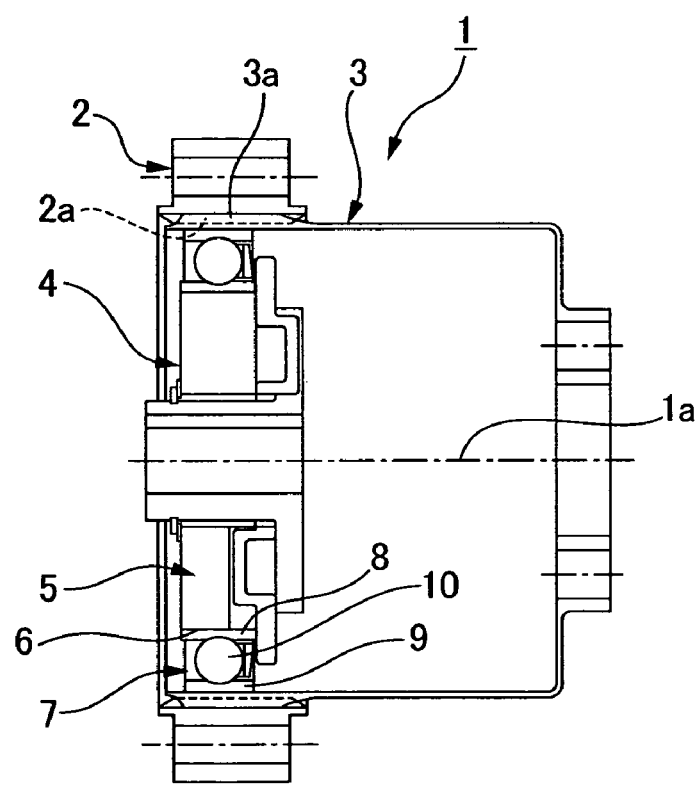
FIG. 1 is a longitudinal sectional view of a wave gear device to which the present invention has been applied.
Figure 2:
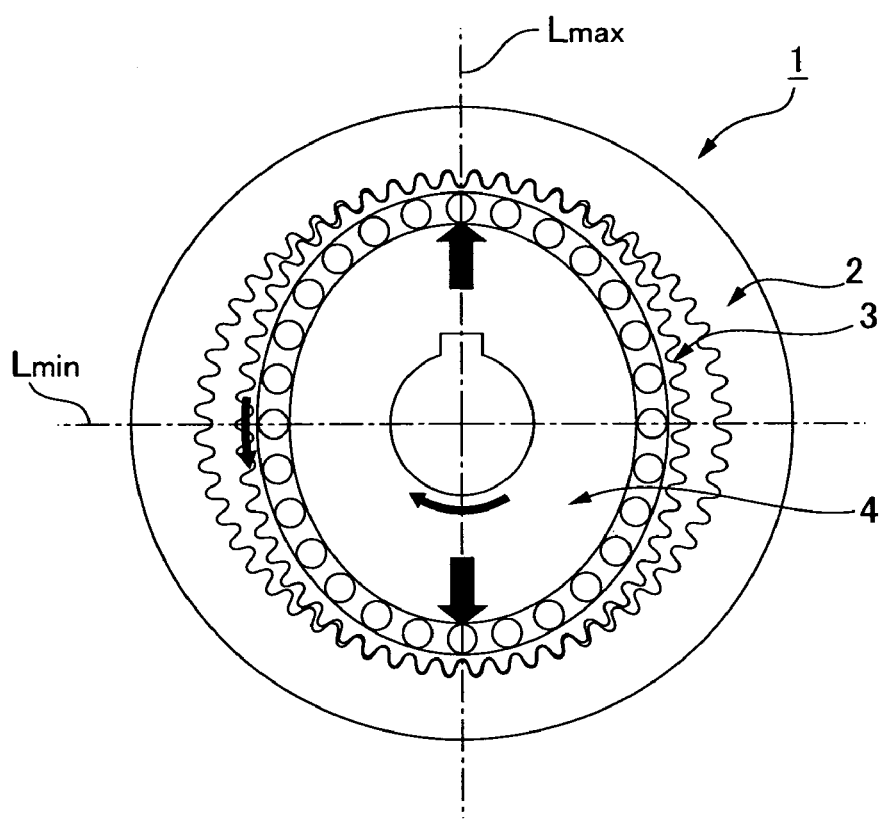
FIG. 2 is a schematic diagram showing the meshing state of the wave gear device of FIG. 1.

FIG. 1 is a longitudinal sectional view of a wave gear device in accordance with the present embodiments, and FIG. 2 is a schematic diagram that indicates the meshing state of the wave gear device. A wave gear device 1 has a rigid internally toothed gear 2, a cup-type flexible externally toothed gear 3 disposed inside the rigid internally toothed gear, and a wave generator 4 having an elliptical profile fitted inside the flexible externally toothed gear. A portion in which an external tooth 3a, in the circular flexible externally toothed gear 3 is formed, is elliptically flexed by the wave generator 4. The two end portions in the elliptical major axis Lmax direction in the external tooth 3a, mesh with an internal tooth 2a of the circular rigid internally toothed gear 2.

A motor shaft or another high speed rotating input shaft is connected to the wave generator 4. When the wave generator 4 rotates, the meshing location of the two gears 2, 3 moves circumferentially, and relative rotation is generated between the two gears 2, 3 due to the difference in the number of teeth of the two gears. For example, the rigid internally toothed gear 2 is secured to prevent rotation, the flexible externally toothed gear 3 is connected to a load member, and reduced-speed rotation is taken from the flexible externally toothed gear 3 and transmitted to the load member.

Figure 3:
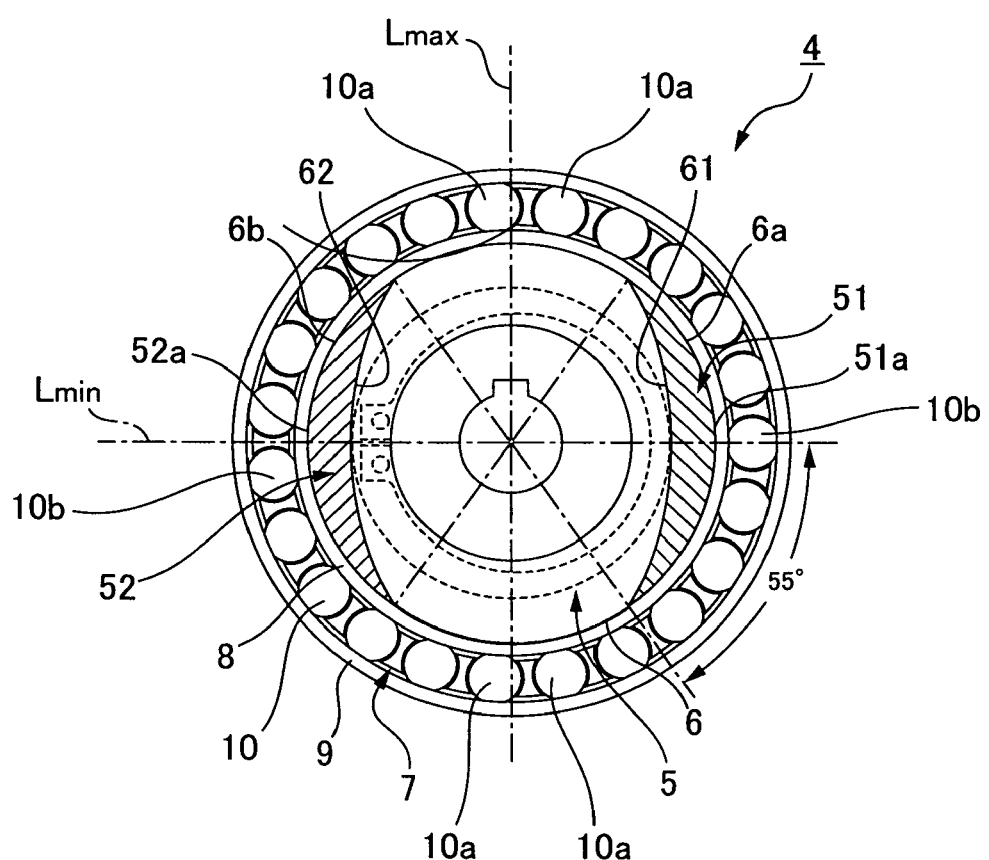
FIG. 3 is a front view showing the wave generator of FIG. 1.

FIG. 3 is a front view that shows the wave generator 4. When described with reference to FIGS. 1 and 3, the wave generator 4 is provided with an elliptically profiled rigid cam plate 5 and a wave bearing 7 mounted on an external peripheral surface 6 of the rigid cam plate. The wave bearing 7 is provided with a circular inner ring 8 and an outer ring 9 that are flexible in the radial direction, and a plurality of balls 10 mounted in a rollable state therebetween.

The wave bearing 7 is fitted inside the flexible externally toothed gear 3 in an elliptically flexed state with the aid of the rigid cam plate 5, and the flexible externally toothed gear 3 and the rigid cam plate 5 connected to the high-speed rotating input shaft are held in a rotatable state relative to each other. That is, the balls 10 inserted between the elliptically flexed inner ring 8 and outer ring 9 rollably move along the raceway surfaces of the inner and outer rings 8, 9, whereby the rigid cam plate 5 and the flexible externally toothed gear 3 can smoothly rotate relative to each other with a small amount of torque.

When described in detail, the wave bearing 7 is elliptically flexed by the rigid cam plate 5, and one or a plurality of balls 10 positioned at the two ends of the elliptical major axis Lmax are tightly sandwiched between the inner and outer rings 8, 9, and are in a state of rolling point contact with the raceway portion of the inner and outer rings. The remaining balls 10 positioned in a portion other than the two ends of the major axis Lmax have a gap between the inner and outer rings 8, 9, and are held in a rollable state. Therefore, the balls 10 inserted between the inner and outer rings 8, 9 roll along the raceway surfaces of the inner and outer rings, and the rigid cam plate 5 and the flexible externally toothed gear 3 can smoothly rotate relative to each other with a small amount of torque.

Here, the rigid cam plate 5 is formed from a material having substantially the same coefficient of linear expansion as the inner and outer rings 8, 9 with the exception of minor axis-side portions 51, 52 that include the two ends 51a, 52a, of a minor axis Lmin. The minor axis-side portions 51, 52 are formed from a material having a coefficient of linear expansion greater than the rigid cam plate. The minor axis-side portions 51, 52 are shown by the diagonal line in FIG. 3.

The minor axis-side portions 51, 52 of the present example have crescent shapes that subtend an angle of 55 degrees to the left and right along an external peripheral surface 6 centered on the two ends 51*a*, 52*a*, of the minor axis Lmin, as seen from the direction of the center axis line (device axis line) 1*a*, of the rigid cam plate 5. In other words, an area surrounded by the circular arcs 6*a*, 6*b*, which have an angle range of 110 degrees in the two end portions of the minor axis that define the elliptical profile of the rigid cam plate 5, and by the circular arcs 61, 62, which have less curvature than the circular arcs 6*a*, 6*b*, is defined as the minor axis-side portions 51, 52.

Steel is a generally used material for the rigid cam plate 5. It is possible to use aluminum alloy, 60/40 brass, beryllium copper, or SUS 305 as the material for the minor axis-side portions 51, 52. The linear coefficients of expansion of the materials are shown below.

| Material | Linear coefficient of expansion/° C. (0 to 100° C.) |
|---|---|
| Steel | 0.0000112 |
| Aluminum alloy | 0.000023 |
| 60/40 brass | 0.0000208 |
| Beryllium copper | 0.0000178 |
| SUS 305 | 0.0000173 |

Figure 4:
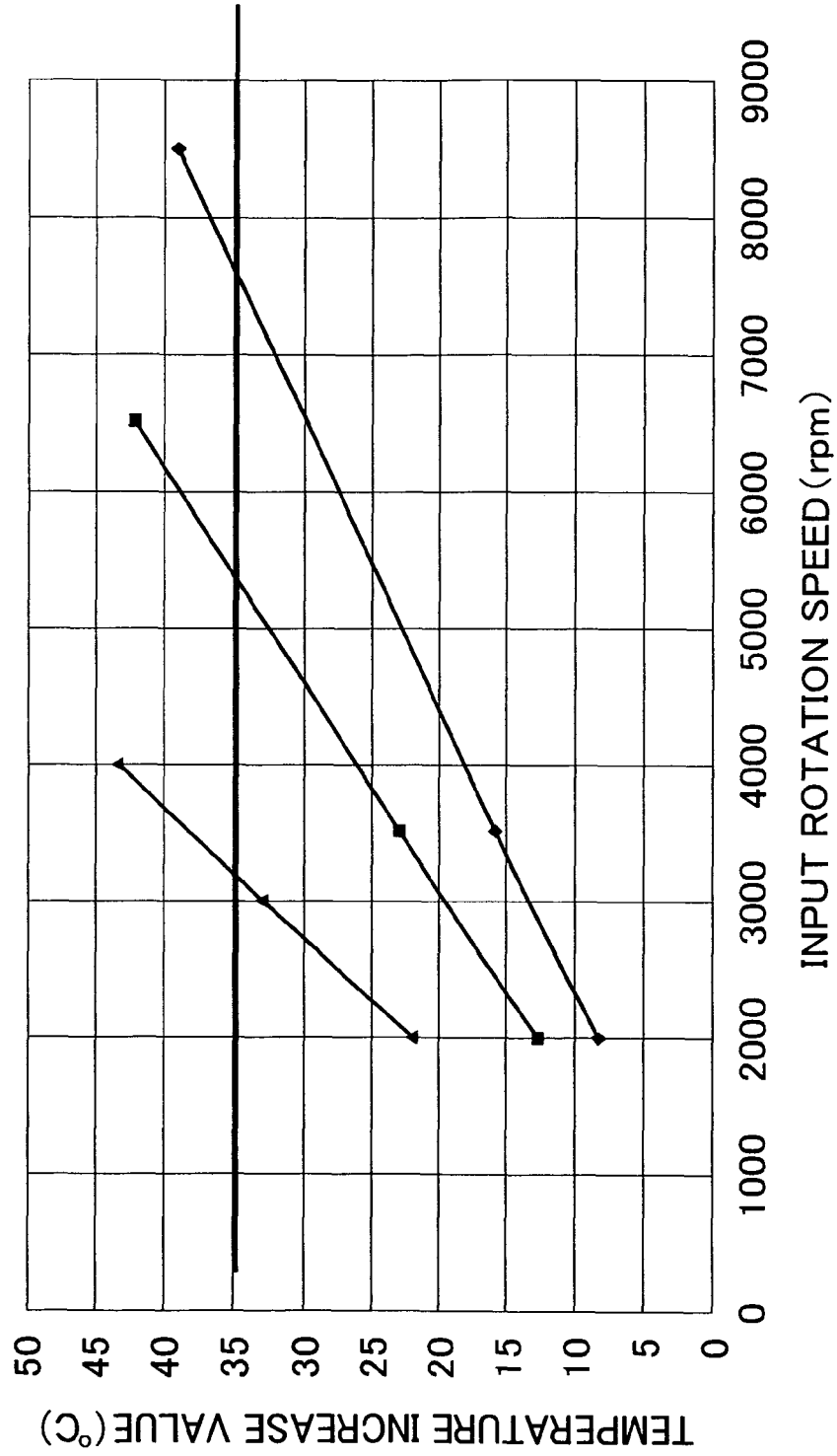
FIG. 4 is a graph showing the relationship between the temperature increase value and the input rotation speed in the wave gear device.

The internal temperature of the wave gear device 1 gradually increases with increasing input rotation speed of the wave generator 4 of the wave gear device 1 having this configuration. The graph in FIG. 4 shows the relationship between the increase value of the internal temperature and the input rotation speed of three different types of wave gear devices. As shown in the graph, the increase of input rotation speed and the increase value of the internal temperature have a substantially inverse relationship.

When the internal temperature increases, the minor axis-side portions 51, 52, which include the two ends 51*a*, 52*a*, of the minor axis Lmin of the rigid cam plate 5, thermally expand to a greater extent than the other portions in accompaniment with the increase in temperature. The gap between the balls 10 and the inner and outer rings 8, 9 in the wave bearing 7 is gradually reduced due to the thermal expansion of the rigid cam plate 5 that accompanies the temperature increase. As a result, not only the balls 10*a*, positioned at the two ends of the major axis Lmax of the wave bearing 7, but also the balls adjacent to the balls 10*a*, become tightly sandwiched between the inner and outer rings 8, 9. As the temperature increases, the number of balls 10 in a tight state gradually increases. When the balls 10, excluding several balls 10*b*, positioned at the two ends of the minor axis Lmin, are in a tight state, the wave bearing 7 enters a locked state, becomes integrated with the rigid cam plate 5, and begins to rotate.

Figure 5:
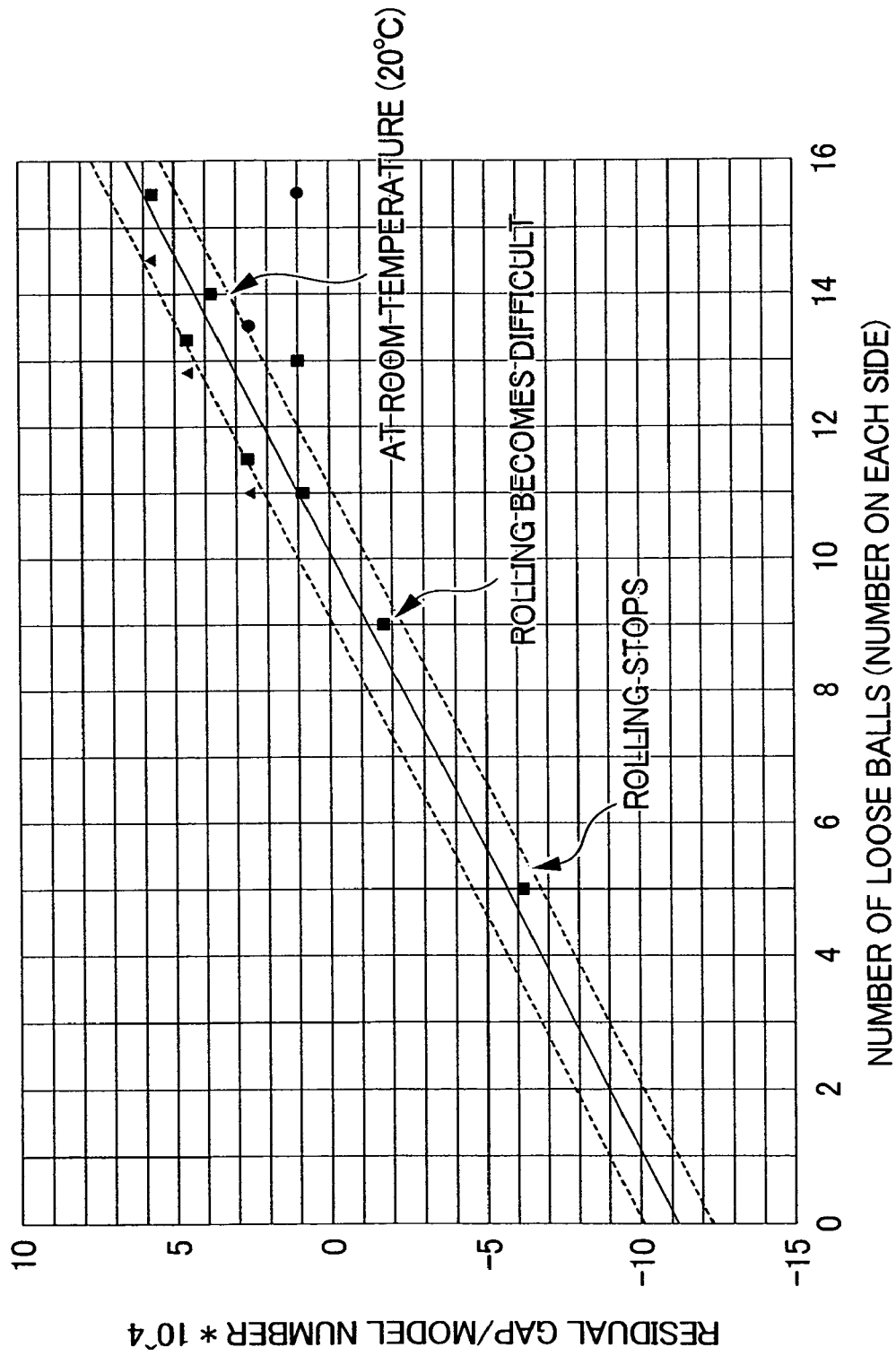
FIG. 5 is a graph showing the relationship between the loose balls and the residual gap in the wave gear device.

The graph of FIG. 5 shows the relationship between the rollable balls (loose balls) and the residual gap between the balls 10 and the inner and outer rings 8, 9 in the wave gear device 1 of the present example. At room temperature (20° C.), there are approximately 14 loose balls and the wave bearing 7 rotates smoothly. In contrast, when the residual gap is reduced (the temperature increases) and the number of loose balls is reduced to about nine, it becomes difficult for the wave bearing 7 to rotate. When the number of loose balls is reduced to about five and the residual gap is reduced, the wave bearing 7 does not rotate and enters a locked state.

Here, the wave bearing 7 can be set in a locked state at a stage in which the internal temperature has increased by a prescribed amount by adjusting the shape formation area of the minor axis-side portions 51, 52 and the value of the linear coefficient of the portions. For example, the coefficient of linear expansion may be selected and the formation area and shape of the minor axis-side portions 51, 52 may be set so that the wave bearing 7 can be set in a locked state when the temperature increase during high-speed rotation reaches approximately 35° C. or higher.

The invention claimed is:

1. A wave generator for a wave gear device comprising:
a rigid cam plate having an elliptical profile; and
a wave bearing mounted on an external peripheral surface of the rigid cam plate, wherein
the wave bearing is provided with an inner ring and an outer ring capable of flexing in a radial direction, and a plurality of rolling elements rollably inserted therebetween, and the outer ring and the inner ring are elliptically flexed by the rigid cam plate,
the rigid cam plate has a minor axis-side portion, which includes a minor axis-side external peripheral end portion positioned at two ends of a minor axis of the elliptical profile of the rigid cam plate, and
the minor axis-side portion is formed from a material having a large coefficient of linear expansion in comparison with a remaining portion of the rigid cam plate.

2. The wave generator for a wave gear device according to claim 1, wherein
the minor axis-side portion, when viewed from a direction of a center axial line of the rigid cam plate, has a crescent shape that extends in a circumferential direction about the two ends of the minor axis.

3. The wave generator for a wave gear device according to claim 1, wherein
the minor axis-side portion is formed in an area having an angle range of 55 degrees to the left and right along the circumferential direction about the two ends of the minor axis.

4. The wave generator for a wave gear device according to claim 1, wherein
the material for the minor axis-side portion is aluminum alloy, 60/40 brass, beryllium copper, or SUS 305, and
a material for the remaining portion of the rigid cam plate is steel.

5. A wave gear device comprising:
a flexible externally toothed gear;
a rigid internally toothed gear; and
a wave generator according to claim 1.

6. A method of preventing a reduction in efficiency of a wave gear device having a flexible externally toothed gear, a rigid internally toothed gear, and a wave generator, the method characterized in:
adopting the wave generator according to claim 1 as the wave generator;
locking the rolling of the rolling elements of the wave bearing with the aid of thermal expansion of the minor axis-side portion when the temperature of the rigid cam plate increases together with an increase in rotation speed of the rigid cam plate, and setting the wave bearing in a locked state of integral rotation with the rigid cam plate; and reducing an agitation resistance brought about by a lubricating agent due to the rolling of the rolling elements, and inhibiting a reduction of the torque transmission efficiency that is caused by the agitation resistance.

7. The method of preventing a reduction in efficiency of the wave gear device according to claim 6, wherein one parameter selected from the shape of the minor axis-side portion, the shape formation area, and the coefficient of linear expansion of the first material that forms the minor axis-side portion is modified, whereby an operating condition is modified at the time the wave bearing switches to a locked state.

8. The method of preventing a reduction in efficiency of the wave gear device according to claim 7, wherein at least one parameter selected from the rotational speed of the rigid cam plate and the value of the elevated temperature of the rigid cam plate is included in the operating condition.

* * * * *